US011173982B2

(12) United States Patent
Angell

(10) Patent No.: US 11,173,982 B2
(45) Date of Patent: Nov. 16, 2021

(54) ACTIVE AIR SPRING

(71) Applicant: Joshua J. Angell, Leggett, CA (US)

(72) Inventor: Joshua J. Angell, Leggett, CA (US)

( * ) Notice: Subject to any disclaimer, the term of this patent is extended or adjusted under 35 U.S.C. 154(b) by 549 days.

(21) Appl. No.: 16/056,195

(22) Filed: Aug. 6, 2018

(65) Prior Publication Data

US 2019/0039680 A1 Feb. 7, 2019

Related U.S. Application Data

(60) Provisional application No. 62/541,528, filed on Aug. 4, 2017.

(51) Int. Cl.
*B62K 25/04* (2006.01)
*F16F 13/00* (2006.01)
(Continued)

(52) U.S. Cl.
CPC ............... *B62K 25/04* (2013.01); *B60G 11/27* (2013.01); *B60G 13/10* (2013.01); *B60G 15/12* (2013.01); *B62K 25/08* (2013.01); *B62K 25/286* (2013.01); *B62K 25/30* (2013.01); *F16F 9/0472* (2013.01); *F16F 13/002* (2013.01); *B60G 2202/152* (2013.01); *B60G 2202/242* (2013.01); *B60G 2300/12* (2013.01); *B60G 2500/201* (2013.01); *B62K 2025/044* (2013.01); *B62K 2025/045* (2013.01); *B62K 2025/048* (2013.01); *B62K 2201/08* (2013.01)

(58) Field of Classification Search
CPC ...... B62K 25/04; B62K 25/08; B62K 25/286; B62K 25/30; B62K 2025/044; B62K 2025/045; B62K 2025/047; B62K 2025/048; B62K 2201/08; F16F 9/0472; F16F 13/002; B60G 11/27; B60G 13/10; B60G 15/08; B60G 15/12; B60G 2202/152; B60G 2202/242; B60G 2300/12; B60G 2500/201

See application file for complete search history.

(56) References Cited

U.S. PATENT DOCUMENTS

| RE27,883 E | * | 1/1974 | Vogel et al. ............ F16F 9/084 |
| | | | 280/6.159 |
| 4,206,934 A | | 6/1980 | McKee |
| | | | (Continued) |

FOREIGN PATENT DOCUMENTS

| JP | H0295918 | 4/1990 |
| JP | H10252798 | 9/1998 |
| | (Continued) | |

OTHER PUBLICATIONS

Volvo Service Manual TP 15052/1 Group 72 Spring Assembly. [2017] Retrieved from internet [Jul. 19, 2017]: http://www.volvodemort.com/technical/volvo/manuals/service/tp15052/group72/index.html.
(Continued)

*Primary Examiner* — Minnah L Seoh
*Assistant Examiner* — Maurice L Williams

(57) ABSTRACT

An active air spring regulates and controls compression and rebound travel, speed, and shock position by modulating internal pressures in an air bag and/or air cylinder in real time by varying the internal volume of discrete air reservoirs in fluid connection with one another as controlled by valves, venting, and self-pressurization.

7 Claims, 4 Drawing Sheets

(51) Int. Cl.
  *B60G 15/12* (2006.01)
  *B62K 25/30* (2006.01)
  *F16F 9/04* (2006.01)
  *B62K 25/28* (2006.01)
  *B60G 11/27* (2006.01)
  *B62K 25/08* (2006.01)
  *B60G 13/10* (2006.01)

(56) References Cited

U.S. PATENT DOCUMENTS

| | | | |
|---|---|---|---|
| 4,336,917 A | 6/1982 | Phillips | |
| 4,502,673 A * | 3/1985 | Clark | B62D 33/071 |
| | | | 180/89.15 |
| 4,635,909 A * | 1/1987 | Gold | F16F 9/49 |
| | | | 267/64.21 |
| 4,669,710 A | 6/1987 | Horvat | |
| 5,082,309 A * | 1/1992 | Schutzner | B60G 17/0152 |
| | | | 280/5.507 |
| 5,098,114 A | 3/1992 | Jones | |
| 5,167,289 A | 12/1992 | Stevenson | |
| 5,263,559 A * | 11/1993 | Mettner | B60G 17/08 |
| | | | 188/266.5 |
| 5,417,042 A * | 5/1995 | Walch | A01B 63/22 |
| | | | 56/15.2 |
| 5,435,530 A * | 7/1995 | Sand | F16F 9/0245 |
| | | | 267/114 |
| 5,649,692 A * | 7/1997 | Gilsdorf | B60G 11/26 |
| | | | 267/64.21 |
| 5,667,203 A * | 9/1997 | Romer | B60G 15/12 |
| | | | 188/322.16 |
| 5,669,597 A | 9/1997 | Rittsteig | |
| 5,775,677 A | 7/1998 | Englund | |
| 6,374,966 B1 * | 4/2002 | Lillbacka | B60G 15/12 |
| | | | 188/266 |
| 6,412,759 B1 | 7/2002 | Krauss | |
| 6,474,629 B2 * | 11/2002 | Beck | F16F 9/064 |
| | | | 188/266.3 |
| 6,782,979 B1 * | 8/2004 | Gold | B60G 15/12 |
| | | | 188/280 |
| 6,814,347 B1 * | 11/2004 | Lemmens | B60G 11/27 |
| | | | 188/266.5 |
| 6,824,146 B2 | 11/2004 | Kang | |
| 6,918,600 B2 | 7/2005 | Dodd et al. | |
| 7,959,135 B2 | 6/2011 | Voelkel | |
| 8,302,944 B1 | 11/2012 | Porumamilla et al. | |
| 8,641,051 B2 | 2/2014 | Pavuk et al. | |
| 8,783,696 B2 * | 7/2014 | Murakami | B60G 13/08 |
| | | | 280/5.514 |
| 8,800,975 B2 * | 8/2014 | Moulik | B60G 15/14 |
| | | | 267/64.24 |
| 8,882,120 B2 * | 11/2014 | Juriga | B60G 17/0275 |
| | | | 280/124.174 |
| 8,899,560 B2 * | 12/2014 | Allen | B60G 15/12 |
| | | | 267/64.26 |
| 8,899,603 B2 | 12/2014 | Van Raaphorst | |
| 9,079,469 B2 * | 7/2015 | Dehmel | B60G 17/044 |
| 9,156,519 B2 * | 10/2015 | Ripa | F16F 9/063 |
| 9,254,727 B2 * | 2/2016 | Moulik | F16F 9/049 |
| 9,327,575 B2 * | 5/2016 | Kim | B60G 11/27 |
| 9,370,984 B2 * | 6/2016 | Leonard | F16F 9/0472 |
| 9,371,882 B2 * | 6/2016 | Haller | B60N 2/502 |
| 9,527,359 B2 * | 12/2016 | Son | F16F 9/54 |
| 9,579,944 B2 * | 2/2017 | Schel | B60G 17/0528 |
| 9,701,170 B2 * | 7/2017 | DeBruler | F16F 9/04 |
| 9,738,131 B2 * | 8/2017 | Keeler | F16F 9/049 |
| 9,969,458 B2 * | 5/2018 | Yoshida | F16F 9/0472 |
| 9,975,598 B2 * | 5/2018 | Bender | B60G 15/063 |
| 9,994,239 B2 * | 6/2018 | Haller | B60G 13/00 |
| 10,131,196 B2 * | 11/2018 | Suissa | B60G 17/0521 |
| 10,464,385 B2 * | 11/2019 | DeBruler | B60G 15/06 |
| 10,611,427 B2 * | 4/2020 | Awano | F16F 9/19 |
| 10,618,366 B2 * | 4/2020 | Pniewski | F16F 9/3271 |
| 10,900,534 B2 * | 1/2021 | Leonard | B60G 17/052 |
| 2017/0015384 A1 * | 1/2017 | Kurita | B62K 21/02 |
| 2017/0240242 A1 * | 8/2017 | Kurita | B62K 25/08 |

FOREIGN PATENT DOCUMENTS

| | | |
|---|---|---|
| KR | WO20030055582 | 7/2003 |
| WO | WO2007068312 | 6/2007 |

OTHER PUBLICATIONS

WABCO manual: Air Suspension Systems/Electronically controlled air suspension system (ECAS). Basic Training 15 [2017] Retrieved from internet [Jul. 19, 2017]: https://www.google.com/url?sa=t&rct=j&q=&esrc=s&source=web&cd=2&ved=2ahUKEwjL-IWSpeHeAhW5ljQIHeuWBulQFjABegQIBRAC&url=http%3A%2F%2Finform.wabco-auto.com%2Fintl%2Fpdf%2F815%2F00%2F57%2F8150100573-15.pdf&usg=AOvVaw0m5SjFdgZnAQRuHVHQ65E3.

Enidine: Air Springs, Air Actuation and Vibration Isolation.[2017] Retrieved from internet [Jul. 19, 2017]: https://www.enidine.com/en-US/Products/AirSprings/.

\* cited by examiner

ACTIVE AIR SPRING

CROSS REFERENCES TO RELATED APPLICATIONS

The present application claims the benefit of the filing date of U.S. Provisional Patent Application Ser. No. 62/541,528, filed Aug. 4, 2017 (Aug. 4, 2017), which is incorporate in its entirety by reference herein.

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

INCORPORATION BY REFERENCE OF MATERIAL SUBMITTED ON A COMPACT DISC

Not applicable.

SEQUENCE LISTING

Not applicable.

BACKGROUND OF THE INVENTION

Field of the Invention

The instant invention relates most generally to shock absorbers for use on vehicles, and more particularly to compressed gas springs, and still more particularly to an active air spring having an air pump incorporated into the shock absorption system to maintain the air spring in an optimum travel position at all times.

Background Discussion

Conventional air springs employ a piston reciprocating inside a pressurized cylinder that compresses air to absorb a shock and the air spring's reciprocating movement is damped by a separate hydraulic assembly. Such air springs are used in telescoping bicycle forks to absorb shock in conjunction with a hydraulic damper that allows the air spring to absorb shock and rebound in a controlled manner by virtue of the hydraulic damper. The damping is largely preset and unable to adjust quickly to varying conditions.

The conventional air springs are pressurized to extend a predetermined length, which sets the spring at a certain height to accommodate a specific rider weight. A rider is able to pressurize or depressurize the air spring using external air inlet/outlet ports so that the spring responds properly under his or her weight and riding conditions. Accordingly, to adjust the air spring, a rider must dismount and either introduce (i.e., pump up) or release pressure manually. The process involves a degree of trial and error, and the spring will still react variously and differently in changing terrain, on varying grades, under different rider weights, etc., so that the air spring setting is almost invariably a compromise.

Another issue with the conventional air spring design is that the piston must prevent air under high pressure from leaking past the piston head, and the springs consequently suffer high friction ("stiction") within the cylinder, meaning that the spring becomes less readily responsive to impacts: they have a kind of stickiness.

These and several other disadvantages of conventional air springs make them a less than perfect solution to the disadvantages of steel coil springs, namely their heavy weights.

The air spring of the present invention overcomes the disadvantages of conventional air springs and introduces several advantageous features that eliminate the above-indicated compromises.

BRIEF SUMMARY OF THE INVENTION

The present invention is an active air spring that modulates internal pressures in real time by varying the internal volume of discrete air spring sections and/or separate reservoirs in fluid connection with one another and controlled by valves, venting, and self-pressurization. The devices regulate and control compression and rebound travel, speed, and shock position.

The air spring can change internal vacuum and/or pressure volumes to change characteristics in response to conditions (weight, shock, incline, braking, etc.). It can be configured to use internal pressure changes caused by the force of a shock as control inputs to adjust shock characteristics in real time to counter the velocity and the energy of the air spring under changing road conditions.

In embodiments, the air spring is a variable-volume air spring using two or more air springs acting in concert, the springs preferably including an air bag and one or more piston/cylinder air springs. The air spring acts as a hybrid air spring/damper to work as a shock absorber by controlling rebound and compression rates in real time by manipulating internal pressures to reduce or increase spring power.

The air spring uses internal or external mechanical or electronic sensors to "read" shock movement and speed to make real time changes in shock characteristics. Sensors react to the speed of movement in real time to ignore slow movements and react to sudden movements, i.e., impacts. In embodiments, when an impact occurs, sensors actuate control valves that change the spring characteristics in direct proportion to the magnitude of the shock. The energy to actuate the control valves is drawn from the shock energy. In rebound, the speed of the shock is "read" and slowed down or sped up in real time to the ideal return speed.

Air pressure changes either inside the spring or in an external device moving in direct relation to the spring can be used as information to determine spring movement and speed. Even tire pressure can be "read" as information to control shock movement and speed. Mechanical or electronic sensors can be used to determine incline, braking, pedaling, etc., and set to control valves to modify air volume in the air spring's air chambers in real time to changing conditions.

The air pump generates and stores air pressure for energy to act as a power amplifier to actuate controls or accessories. It is a real-time active shock that uses air pressure changes as energy and information to respond, also in real time, to all changing conditions directly and proportionately. It is dynamic inasmuch as it can simultaneously act a spring and/or damper and can change functions spontaneously according to conditions.

The active air spring is a "self-charging" air spring, air bag-type spring, or shock absorber that uses its own movement to increase internal pressure and/or vacuum or to store pressure and/or vacuum in a separate reservoir. The air spring uses pressure and vacuum simultaneously to increase strength and to facilitate rapid changes in shock characteristics.

From the views, it will be appreciated that in embodiments the air spring is a hybrid air spring using a piston-type spring coupled with an air bag-type spring acting separately to create a single outcome and facilitate immediate changes in characteristics.

In an embodiment, the air spring includes one or more remote reservoirs connected by valves to an air spring to control the internal pressure, the vacuum, and/or the volume of air in the air spring to modify its behavior in real time.

A "vacuum lock" using the vacuum created on the opposing side of a piston in an air spring to allow an air spring or damper to "lock" in position and be released spontaneously to respond to an impact.

The invention provides a shock absorber that uses its own kinetic energy as information and energy to modulate an impact as it happens. The apparatus includes one or more control valves that uses kinetic energy or internal pressure changes of the system under load as the information and energy to modulate movement.

The foregoing summary broadly sets out the more important features and objects and advantages of the present invention so that the detailed description that follows may be better understood, and so that the present contributions to the art may be better appreciated. There are additional features of the invention that will be described in the detailed description of the preferred embodiments of the invention which will form the subject matter of the claims appended hereto.

Accordingly, before explaining the preferred embodiment of the disclosure in detail, it is to be understood that the disclosure is not limited in its application to the details of the construction and the arrangements set forth in the following description or illustrated in the drawings. The inventive apparatus described herein is capable of other embodiments and of being practiced and carried out in various ways.

DESCRIPTION OF THE INVENTION

Figure 1:
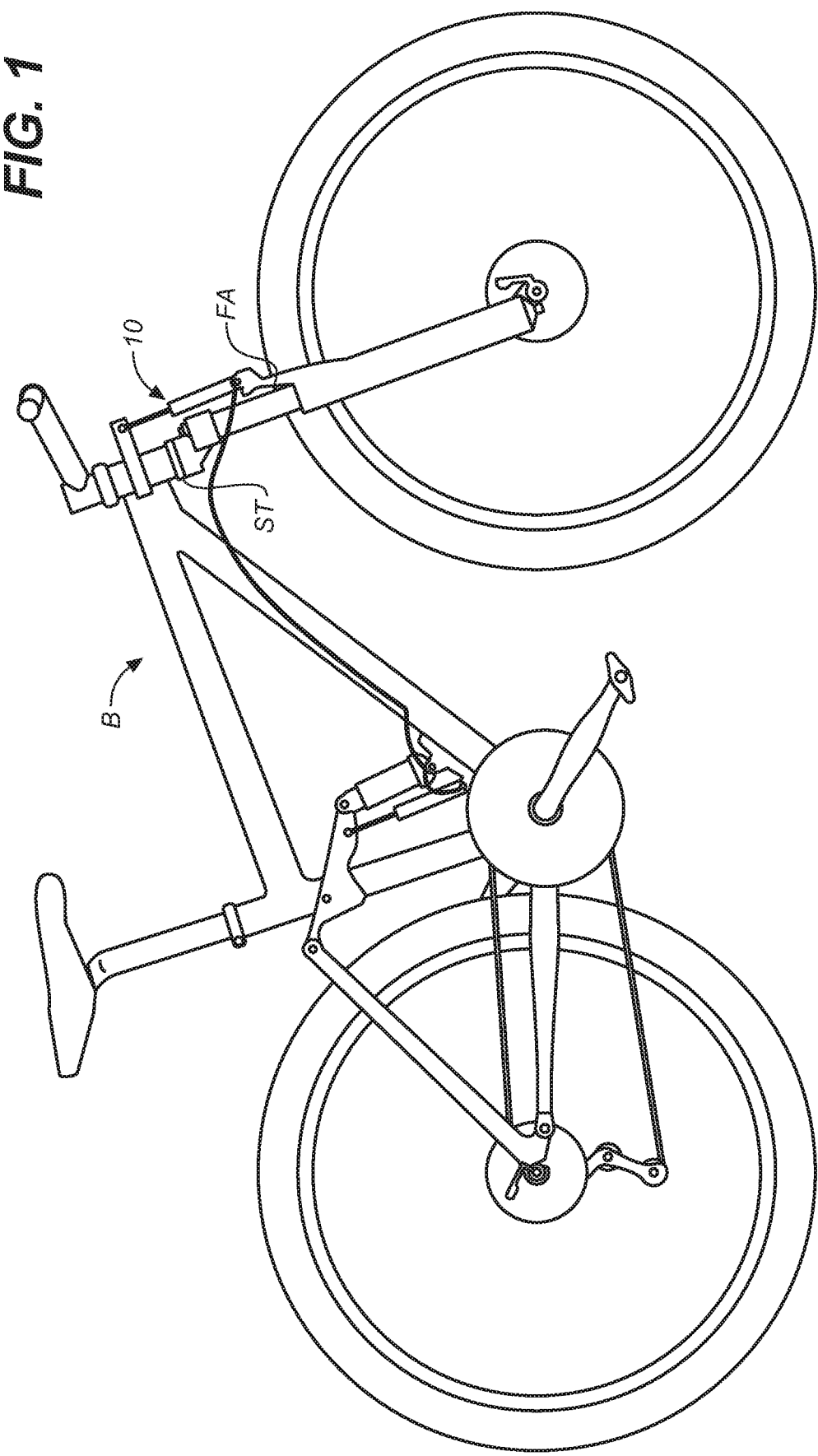
FIG. 1 is a schematic side view in elevation showing the inventive air spring installed on the front shocks of a bicycle.

Referring to FIGS. 1 through 4, wherein like reference numerals refer to like components in the various views, there is illustrated therein a new and improved air spring for a shock absorber system for vehicles, generally denominated 10 herein. FIG. 1 shows the invention 10 installed on a typical mountain bike B, a vehicle selected for illustrative purposes but not defining or limiting the potential fields of use. Here it is seen that the air spring may be mounted on the steering tube ST or fork crown FC at the upper end of the stanchions S, and the fork arch (or brace) FA ad the upper end of the lowers L of a mountain bike.

Figure 2:
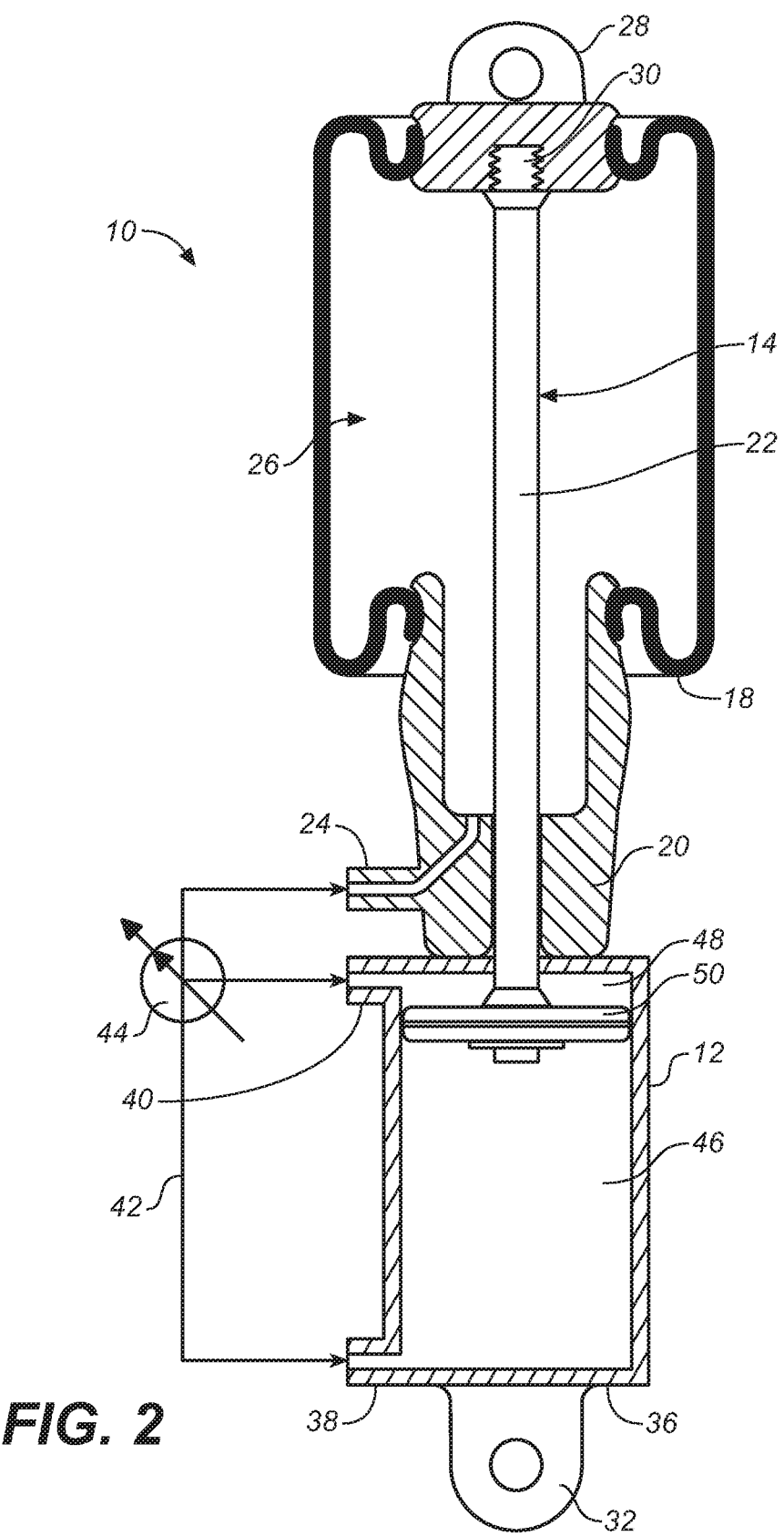
FIG. 2 is a highly schematic cross-sectional side view in elevation of an embodiment of the active air spring of the invention.

In an embodiment 10, as shown in FIG. 2, the air shock of the present invention includes a gas (air) cylinder 12, a piston 14, and a compressible air bag 16 stacked in either orientation (air bag above air cylinder or the reverse) to create a unified shock absorber 10. The air bag is sealingly coupled at its lower end 18 to the air cylinder with a fitting 20, which allows passage of the reciprocating piston rod 22 and includes a gas control port 24 in fluid communication with the interior gas volume 26 of the air bag.

A first mount (eyelet) 28 sealingly couples to the upper end of the air bag and to the upper end 30 of the piston rod 22, and a second mount (eyelet) 32 is integral with or affixed to the end 34 of the bottom side 36 of air cylinder 12. The upper mount attaches to a vehicle frame while the lower mount attaches to moving wheel structure, in a manner well known in the art.

Air cylinder 12 includes a pressure side control port 38 and a vacuum side control port 40 in fluid communication with one another and with the air bag gas control port 24 through a fluid line 42 with a control valve 44 that may be manually set and/or automatically responsive to shock conditions to regulate flow from the positive pressure side 46 of the air cylinder interior volume to the negative pressure (vacuum) side 48 of the air cylinder, which correspond, respectively, to the upper and lower sides of the piston head 50.

When the shock is compressed, a vacuum or negative pressure forms on the vacuum side 48 of piston head 50, while a positive pressure forms on the positive pressure side 46. If desired, control valve 44 may be set to remain closed and the piston thus remains locked in the expanded position. Otherwise, control valve 44 can be opened or set to open in varying degrees to control shock movement by placing the control ports 24, 38, 40 into varying degrees of fluid communication with one another and with ambient air. Control valve 44 can spontaneously control pressures and vacuums and in turn shock velocity and position. Not shown are intake and exhaust valves in air cylinder 12 which may be installed to enable it to act as an air pump with shock movement, as desired. Also, as will be appreciated, piston head 50 includes packing and rings to slidingly seal the head within and against the interior side of air cylinder 12 so as to prevent air bleeding past piston head 50 when in operation. The structures required to accomplish such a seal are well known and in no need of detailed description here.

Figure 3:
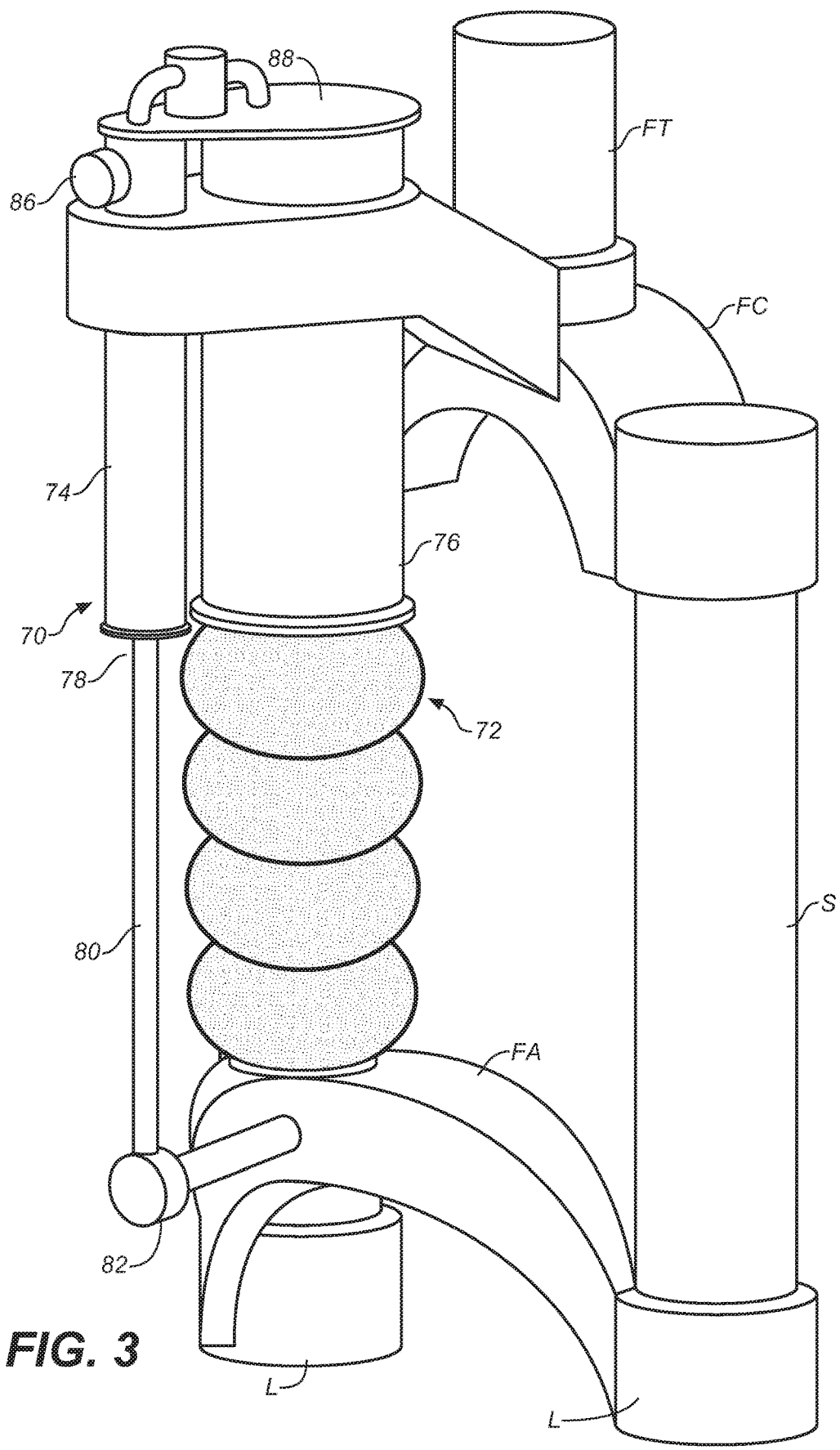
FIG. 3 is an upper perspective view of another embodiment having an air pump installed alongside the air cylinder and air bag to move in direct relation to spring movements and thus "read" spring speed and movement.

FIG. 3 shows an alternative embodiment of the inventive air spring, which include all of the elements of FIG. 2 in primary shock assembly 72 (thus promoting and importing those elements herein), as well as a supplementary air pump 74 in fluid communication with the air cylinder 76. Air cylinder and air bag porting and coupling are the same as recited with respect to FIG. 2. Here, however, an air pump is provided to be responsive to shock movements. The assembly is installed, for instance, on the fork arch FA and steering tube ST or fork crown FC of a mountain bike. The air pump include a reciprocating piston 78 having a piston rod 80 with an eyelet 82 secured with a bolt 84 coaxially disposed through eyelet 82 and lower mount 84 of the primary shock assembly 72. A movement sensor 86 detects movements of piston 80 within the air pump and 74 and opens or closes the control valve (not shown in this view) for the primary shock assembly 72. Further, the air pump is in fluid communication with the positive pressure side 88 of the air cylinder 76 through a gas line 90, the gas movement controlled by a two way valve 92. In compression, the control valve is closed and air spring piston movement is fully enabled. The movement sensor may open the control valve in proportion to impact forces, thereby equalizing piston pressure. The movement sensor also detects rebound and actuates the air spring control valve to open and equalize pressure in the air spring cylinder, thereby enabling the air spring bag to rebound a predetermined percentage of spring power.

Figure 4:
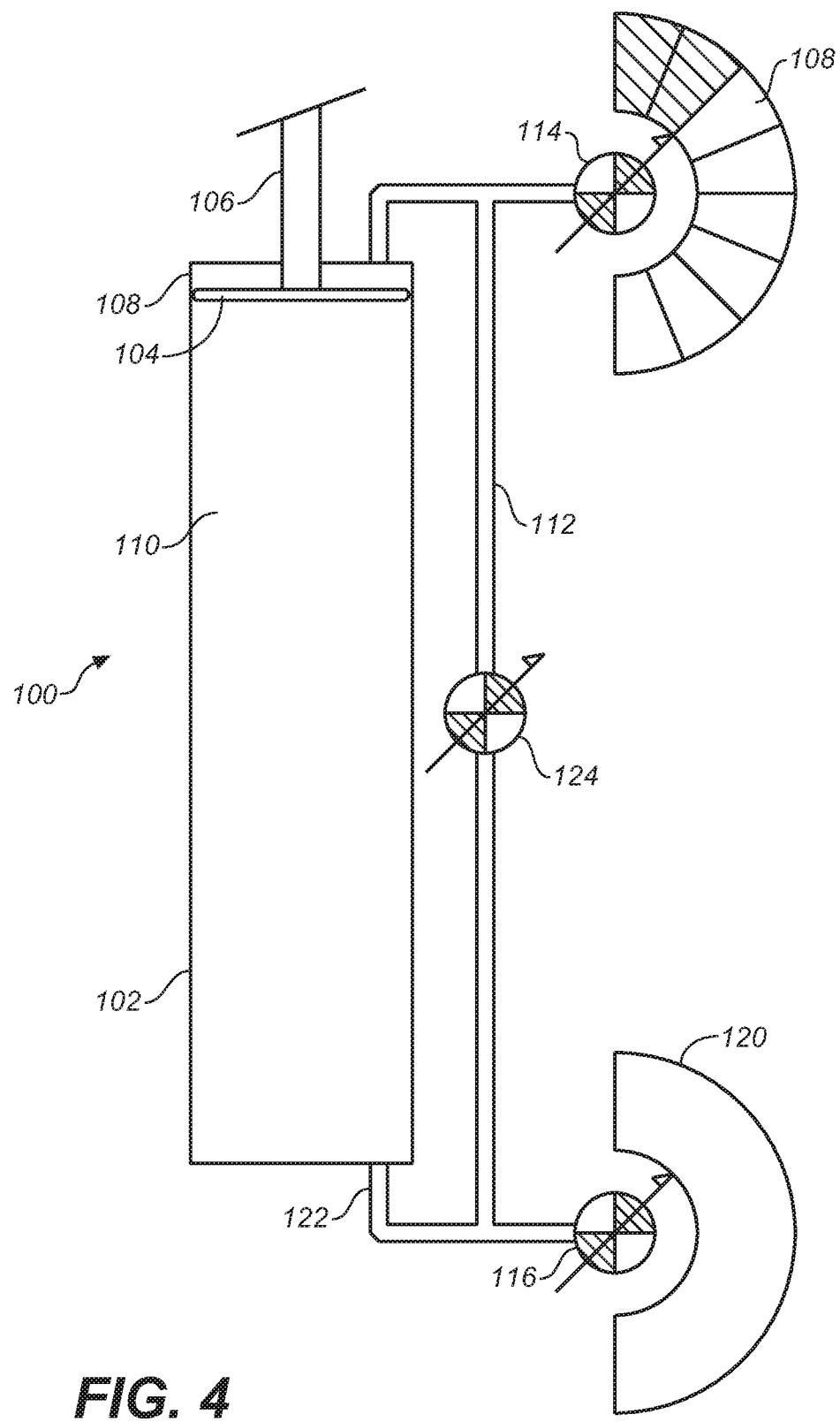
FIG. 4 is a highly schematic cross-sectional side view in elevation of an alternative embodiment.

Referring next to FIG. 4, in another embodiment 100 the inventive air spring is formed in a conventional fashion for incorporation in a telescoping fork of the kind shown in FIG. 2. This embodiment includes a cylinder 102, a piston head 104 and a connecting rod 106. The connecting rod and cylinder are connected between the stanchions and the lowers of a telescoping fork to act as a spring. In this configuration the piston has a negative pressure (vacuum) side 108, and a positive pressure side 110. Air lines 112 connect the vacuum side and positive pressure side through variable vacuum reservoir valve 114, and 116, to their respective corresponding reservoirs, variable vacuum reservoir 118, and pressure reservoir 120, preferably mounted on the crown of the telescoping forks.

When the telescoping fork is weighted and compressed, variable vacuum reservoir valve 112 is closed, and a strong vacuum is formed on the vacuum side 108 of the air cylinder 102. Thus, the telescoping fork will ride as stiffly as a fixed fork. With mechanical or electronic input the vacuum valve 114 can selectively open or close sequentially to a series of partitioned air reservoirs to add or subtract volume and change the negative pressure, thereby instantly changing the fork preload. The positive pressure side is connected by air lines 122 through pressure reservoir valve 116 to remote pressure reservoir 120. The volume of air cylinder 102 is a fraction of the pressure reservoir volume; accordingly, the internal pressure does not increase greatly even when the piston is fully compressed, and the air spring can work in a linear fashion. Pressure reservoir valve 116 can be actuated at any time during fork movement to increase or reduce pressure volume and to alter the fork rebound or compression characteristics.

Equalization (charge) valve 124 can open to equalize pressure to change the compression and rebound characteristics and "recharge" the vacuum and compression sides on every stroke so that all fork parameters can reset instantly, if desired. In such a configuration, the vacuum and pressure sides work synergistically, combining pressures to increase spring strength. The pressure side works more as a conventional air spring with a relatively constant pressure, and the vacuum works as the variable side that instantly adjusts preload, rebound, compression, and height for varying conditions. Because the vacuum and pressure sides work together, internal pressure is greatly reduced. And note that the vacuum can be controlled to lock the forks in position on smooth terrain and release instantly to respond to impacts.

From the foregoing, it will be seen that the inventive air spring is an active air spring that includes a plurality of air springs, a preferred embodiment being an air bag type spring combined with an air cylinder spring, which modulate internal pressures by varying internal volume through fluid lines and reservoirs, either external or internal only, connected by valves, venting, and self-pressurization to control compression and rebound travel and speed and shock position.

What is claimed as invention is:

1. An active air spring for use on vehicles, comprising:
an air bag spring which includes a compressible air bag having an upper end and a lower end, said upper end sealingly connected to a first mount;
an air cylinder having an upper end and a lower end and defining an interior gas volume, said air cylinder having a pressure side gas port and a vacuum side gas port and having a second mount disposed on said lower end;
a fitting sealingly coupling said air bag to said air cylinder and having a gas control port in fluid communication with said interior gas volume of said air bag;
a piston having a piston rod connected at one end to said first mount, slidingly passing through said fitting, and coupled at a second end to a piston head slidingly disposed in said air cylinder, said piston head having an upper side defining a negative pressure side of said air cylinder and a lower side defining a positive pressure side of said air cylinder;
a fluid line connecting said pressure side gas port, said vacuum side gas port, and said gas control port; and
an adjustable control valve disposed on said fluid line that may be set to be selectively or automatically responsive to shock conditions to regulate gas flow from said positive pressure side of said air cylinder interior gas volume to said negative pressure side of said air cylinder;
wherein said air bag spring modulates internal air cylinder pressures by changing the relative pressures of said positive pressure side and said negative pressure side through said fluid line and said adjustable control valve to control compression and rebound travel and speed and shock position.

2. The active air spring of claim 1, wherein said air spring is both a spring and a damper and switches functions according to impact conditions.

3. The active air spring of claim 1, wherein a vacuum on said negative pressure side of said air chamber is employed to lock said piston in position and to be released spontaneously to respond to an impact.

4. The active air spring of claim 1, wherein when said compressible air bag is compressed, a vacuum or negative pressure forms on said negative pressure side of said piston head and a positive pressure forms on said positive pressure side.

5. The active air spring of claim 4, wherein when said control valve is in a closed position, said piston is locked in an extended position.

6. The active air spring of claim 5, wherein said control valve may be selectively opened in varying degrees to control shock movement by placing said gas control port, said pressure side gas port, and said vacuum side gas port into varying degrees of fluid communication with one another and with ambient air.

7. The active air spring of claim 6, wherein said control valve controls pressures and vacuums to adjust shock velocity and position.

* * * * *